United States Patent [19]

White

[11] 4,057,892
[45] Nov. 15, 1977

[54] METHOD OF INSTALLING A WATER HEATER IN A RECREATIONAL VEHICLES

[75] Inventor: Donald M. White, Rockford, Ill.

[73] Assignee: Atwood Vacuum Machine Company, Rockford, Ill.

[21] Appl. No.: 710,460

[22] Filed: Aug. 2, 1976

Related U.S. Application Data

[62] Division of Ser. No. 537,903, Jan. 2, 1975, Pat. No. 3,986,492.

[51] Int. Cl.² .......................................... B23P 19/00
[52] U.S. Cl. .................................. 29/526 R; 220/18
[58] Field of Search ............... 29/469, 445, 526, 512; 220/18; 62/263; 126/350 A; 237/12.3 B; 296/23 R

[56] References Cited

U.S. PATENT DOCUMENTS

| 723,318 | 3/1903 | Schiefer | 220/18 X |
|---|---|---|---|
| 1,702,775 | 2/1929 | Hauser | 126/350 A UX |
| 2,549,547 | 4/1951 | Trask | 62/263 X |
| 2,567,309 | 9/1951 | Adair et al. | 220/18 |
| 2,826,755 | 3/1958 | Aiken | 220/18 X |
| 2,930,505 | 3/1960 | Meyer | 220/18 |
| 3,186,186 | 6/1965 | Kleist | 62/263 |
| 3,289,287 | 12/1966 | Guritz | 29/512 X |
| 3,404,539 | 10/1968 | Laing | 62/263 X |
| 3,570,108 | 3/1971 | Sarra | 29/469 |

Primary Examiner—Charlie T. Moon
Attorney, Agent, or Firm—Leydig, Voit, Osann, Mayer & Holt, Ltd.

[57] ABSTRACT

The water heater includes an open-ended, box-like case fabricated from sheet metal panels and adapted to be pulled through an opening in a vehicle wall after the wall has been erected. Thereafter, the margins of the panels may be bent outwardly by hand to form right angle mounting flanges adapted to lie in face-to-face relation with the wall.

1 Claim, 5 Drawing Figures

4,057,892

METHOD OF INSTALLING A WATER HEATER IN A RECREATIONAL VEHICLES

This is a division, of application Ser. No. 537,903, filed Jan. 2, 1975, now U.S. Pat. No. 3,986,492.

BACKGROUND OF THE INVENTION

This invention relates to a water heater and, more particularly, to a water heater which is especially suitable for use in the coach of a recreational vehicle. Such a water heater usually includes a box-like case fabricated from sheet metal panels and adapted to be fitted within an opening in the wall of the coach. A mounting flange is associated with the case and extends around the opening in face-to-face relation with the outer or forward side of the coach wall.

SUMMARY OF THE INVENTION

The general aim of the present invention is to provide a new and improved water heater having a comparatively simple case with unique panels which enable the coach manufacturer to place the heater on the floor of the coach and connect the gas and water lines to the heater before erecting the adjacent wall of the coach and while the gas and water lines are readily accessible. After the coach wall has been erected, the case may be shifted forwardly through an opening in the wall and then the forward end portions of the panels may be bent outwardly in an easy manner so as to form mounting flanges adapted to lie against the coach wall.

A further object is to provide a water heater case whose panels are formed with slits and louvers which enable the forward end portion of each panel to be easily bent by hand to form a right angled mounting flange after the case has been shifted through the opening in the coach wall.

Another object is to provide louvers which close up the slits as the flange is bent and which form a substantially weatherproof seal between the flange and the coach wall.

These and other objects and advantages of the invention will become more apparent from the following detailed description when taken in conjunction with the accompanying drawings.

DETAILED DESCRIPTION OF THE PREFERRED EMBODIMENT

Figure 1:
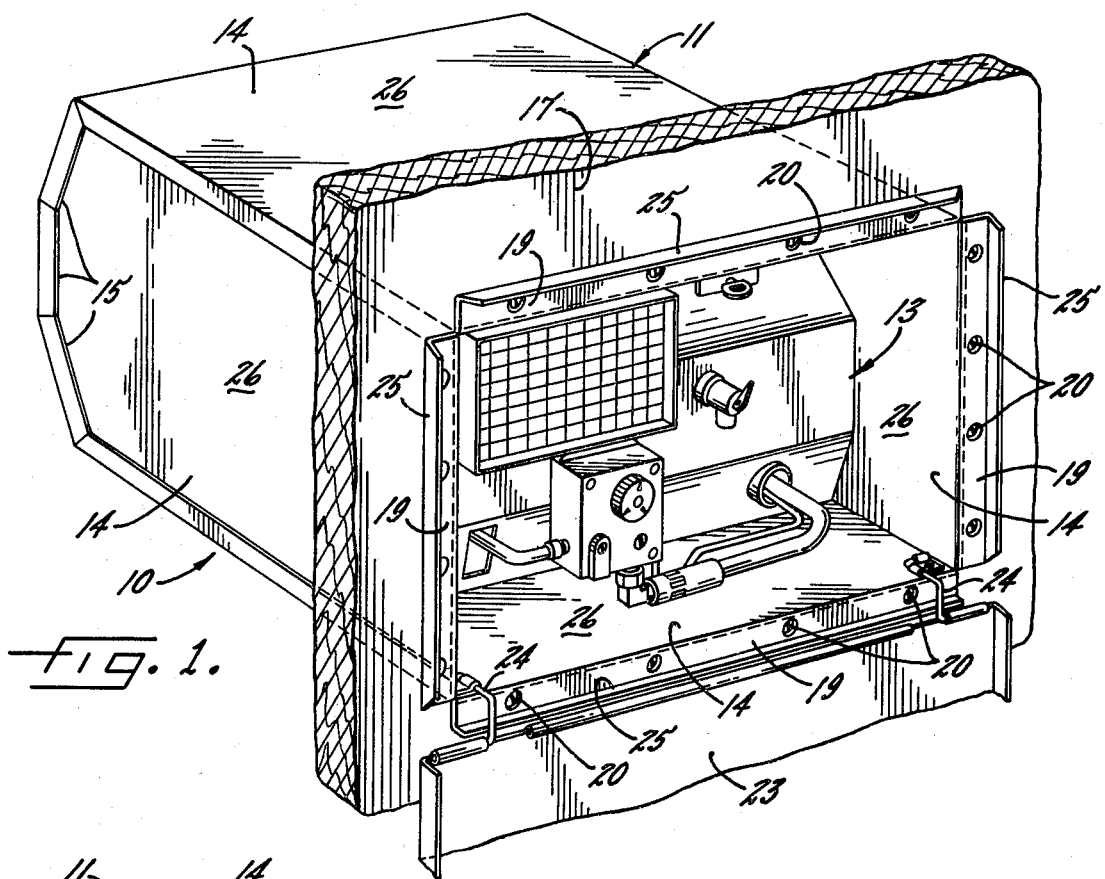
FIG. 1 is a perspective view showing the new and improved water heater of the present invention as installed in the wall of the coach.

For purposes of illustration, the invention is shown in the drawings as embodied in a water heater 10 which is installed within the coach of a recreational vehicle such as a travel trailer. In this instance, the heater includes a box-like case 11 within which is housed a gas water heating unit 13 adapted to be connected to the gas and water lines of the coach.

The case 11 is of substantially rectangular cross-section and has an open outer access end, hereafter referred to as the "forward" end. The case is fabricated from four sheet metal panels 14, namely, a generally horizontal top panel, a generally horizontal bottom panel and two vertical side panels which extend between the top and bottom panels. Extensions 15 are bent from the inner or rear portions of the top and bottom panels and join one another to form the rear side of the case.

Figure 2:
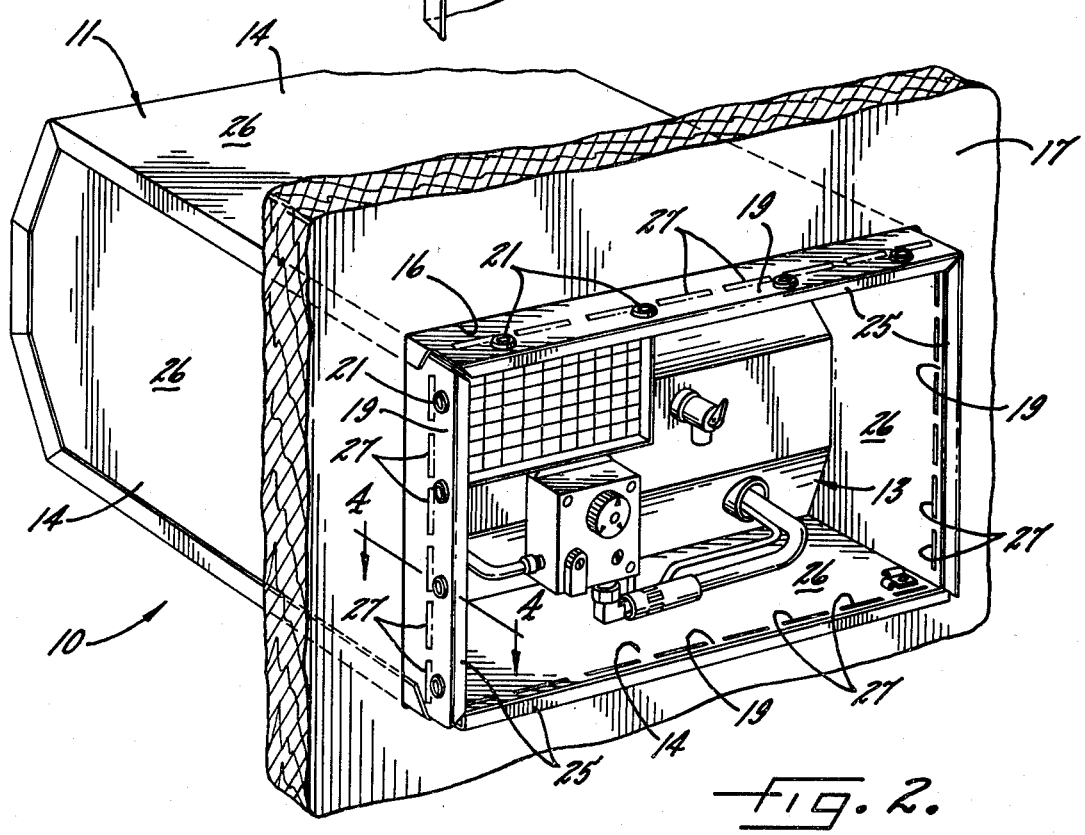
FIG. 2 is a view similar to FIG. 1 but shows the heater before the panels have been bent.

As shown in FIG. 2, the case 11 projects through a rectangular opening 16 in one side wall 17 of the coach and its forward end is substantially flush with the outer or forward side of the side wall when the heater 10 is fully installed as shown in FIG. 1. Associated with the case are flanges 19 which extend around the margins of the opening 16 and lie face-to-face against the forward side of the wall 17. Screws 20 (FIGS. 1 and 5) extend through holes 21 in the flanges and fasten the heater 10 to the wall. A cover 23 (FIG. 1) is removably hinged at 24 to the bottom panel 14 and, when closed, embraces lips 25 formed integrally with and projecting forwardly from the outer margins of the flanges 19. When the cover is swung downwardly, the controls of the water heating unit 13 are accessible from outside the coach.

In accordance with the present invention, each panel 14 of the water heater 10 is uniquely formed such that its flange 19 initially lies in substantially the same plane as the main body 26 of the panel but may be easily bent outwardly by hand to a position extending perpendicular to the main body. Before bending the flanges and erecting the coach wall 17, the heater may be installed on the floor of the coach and connected to the gas and water lines while the latter are still easily accessible. After the wall has been erected and the opening 16 has been cut, the case 11 with the unbent flanges 19 may be shifted forwardly through the opening to position the flanges forwardly of the forward side of the wall (see FIG. 2). The flanges then may be bent outwardly and into face-to-face relation with the wall as shown in FIG. 1, the bending being achieved easily by hand and without need of tools.

Figure 3:
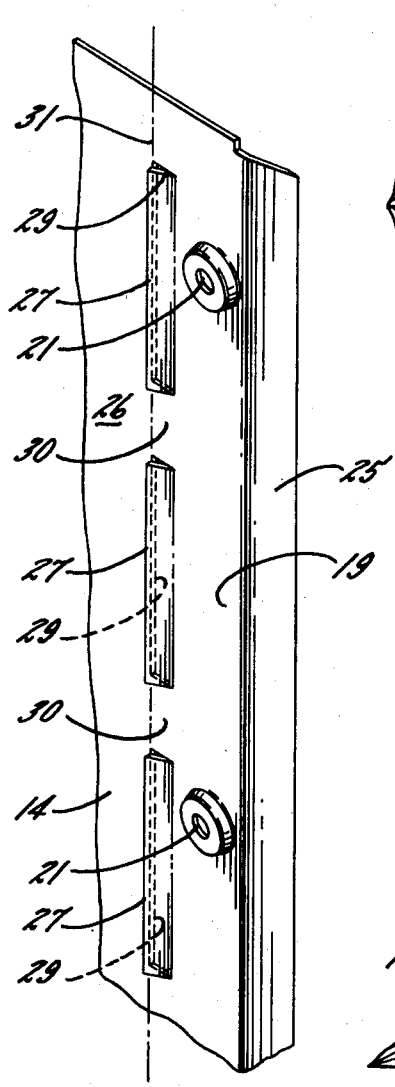
FIG. 3 is a perspective view showing a portion of one of the panels before the panel has been bent.
Figure 4:
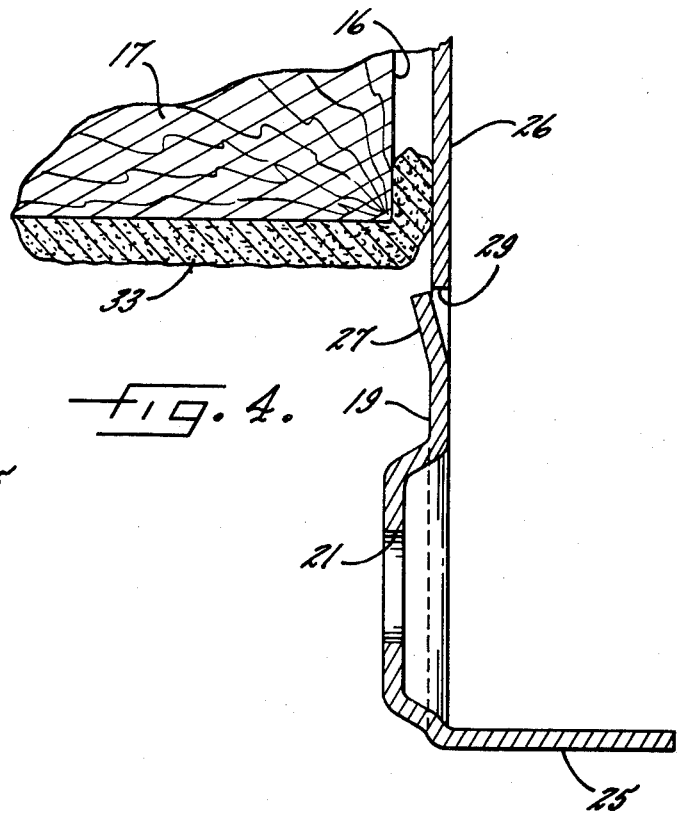
FIG. 4 is an enlarged fragmentary cross-section taken substantially along the line 4—4 of FIG. 2.
Figure 5:
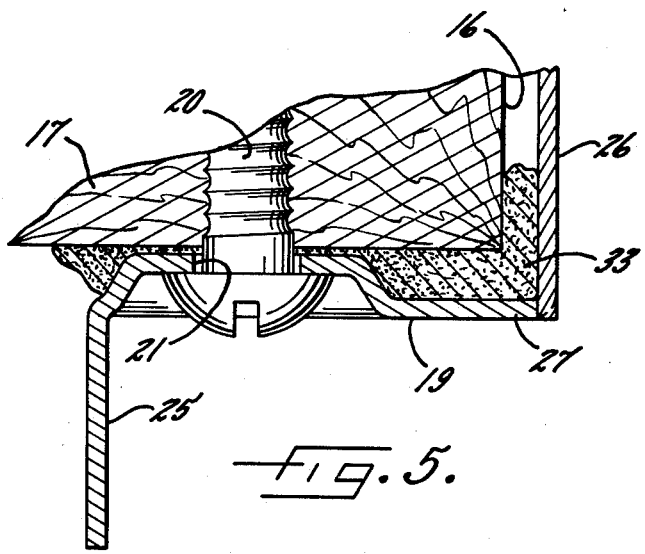
FIG. 5 is a view similar to FIG. 4 but shows the panel after the panel has been bent and secured to the coach wall.

The panel 14 shown in FIGS. 3 to 5 is the left side panel and its construction is exemplary of the other three panels. As shown in FIGS. 3 and 4, the flange 19 and the main body 26 of the panel initially lie in the same plane, the flange defines the forward marginal portion of the panel, and the lip 25 projects inwardly from the forward margin of the flange. Several substantially rectangular louvers 27 are struck outwardly from the metal of the panel and are spaced from one another along a row located adjacent the junction between the main body 26 and the flange 19 and extending parallel to the forward margin of the flange.

Each louver 27 is formed by lancing the panel 14 and each initially extends outwardly and rearwardly at an angle of about fifteen degrees. By virtue of being lanced from the panel, each louver leaves a three-edged slit 29 (FIGS. 3 and 4) extending through the panel. The forward margin of the louver remains joined to the forward margin of the slit while the rear and end edges of the louver are spaced outwardly from the rear and end edges, respectively, of the slit. As a result, adjacent end edges of adjacent slits are joined by connecting straps 30 (FIG. 3) which are comparatively short in length and have little resistance to bending. In effect, the slits establish a line of bending (indicated by the dotted line 31 shown in FIG. 3) which coincides precisely with the rear edges of the slits and which extends across the connecting straps 30. Thus, the straps will bend along the line 31 when an outward bending force is exerted on the flange.

The flanges 19 are left unbent when the heater 10 is first installed on the floor of the coach. During initial installation, the heater 10 is positioned rearwardly sufficiently far to enable erection of the side wall 17. Also, the water and gas lines are connected to the heating unit 13 will sufficient flexibility to enable the heater to subsequently be pulled forwardly through the opening 16 in the side wall.

After the wall 17 has been erected and the opening 16 has been cut, a layer of caulking 33 (FIG. 4) is applied to the forward side of the wall around the margins of the opening. Thereafter, the case 11 is pulled forwardly through the opening until the rear edges of the slits 29 are located forwardly of the forward side of the wall (see FIGS. 2 and 4). The installer then may grip each flange 19 by hand and easily bend the flange about the bend line 31 until the flange is positioned at right angles to the main body 26 and is pressed against the caulking (see FIGS. 1 and 5). As the flange bends, the louvers 27 move with the flange and thus move into and substantially close the slits 29 when the flange is fully bent. Accordingly, the louvers cause the slits to be self-sealing and they thus establish a substantially weatherproof seal along and adjacent to the line of bending. Also, the louvers leave the bend smooth and substantially free of sharp edges since the louvers close up the slits and shield the edges thereof.

Installation of the water heater 10 is completed by driving the mounting screws 20 and attaching the cover 23 to the bottom panel 14. Should the heater require servicing or replacement, it can easily be pulled forwardly out of the opening 16 from outside the coach.

I claim as my invention:

1. A method of installing a water heater having a boxlike case of rectangular cross-section, said case being made of sheet metal panels and having an open forward end, said method comprising the steps of inserting the forward end of said case forwardly through an opening in a wall and past the forward side of the wall, bending the forward margins of said panels outwardly to form flanges lying in face-to-face relation with the forward side of said wall, and securing said flanges to said wall.

* * * * *